United States Patent
Francis

[15] 3,683,080
[45] Aug. 8, 1972

[54] COMPOSITIONS FOR INHIBITING ANOMALOUS DEPOSITION AND MOBILIZATION OF CALCIUM PHOSPHATE IN ANIMAL TISSUE

[72] Inventor: Marion D. Francis, Springfield Township, Hamilton County, Ohio

[73] Assignee: The Procter & Gamble Company, Cincinnati, Ohio

[22] Filed: Aug. 28, 1970

[21] Appl. No.: 68,029

Related U.S. Application Data

[63] Continuation of Ser. No. 775,203, Nov. 12, 1968, abandoned, which is a continuation-in-part of Ser. No. 717,995, April 1, 1968, abandoned, which is a continuation-in-part of Ser. No. 689,290, Dec. 11, 1967, abandoned.

[52] U.S. Cl. ................................................424/204
[51] Int. Cl. .............................................A61k 27/00
[58] Field of Search..........424/204, 49; 260/502.4 P; 99/2 M

[56] References Cited

UNITED STATES PATENTS

| | | | |
|---|---|---|---|
| 3,297,578 | 1/1967 | Crutchfield et al. | 260/502.4 P |
| 3,299,123 | 1/1967 | Fitch et al. | 260/502.4 P |
| 3,317,378 | 5/1967 | Woods et al. | 99/2 M |
| 3,488,419 | 1/1970 | McCune et al. | 424/49 |
| 3,551,339 | 12/1970 | Quimby | 260/502.4 P |

OTHER PUBLICATIONS

Schibler et al., Clin. Sci. 35, 363– 372 (1968)
Irving et al., Proc. Soc. Exptl. Biol. & Med., Vol. 122, pp. 852– 856
Bessman et al., Ann. Int. Med., Vol. 47, pages 1036– 1041, Nov. 1957.
Current Therapy 1965, published by W. B. Saunders Co., Phila., 1965 page 505.
Drill' s Pharmacology in Medicine, published by Mc-Graw–Hill Book Co., New York, 1965, pages 855– 858.
Goldberg, Antibiotics: Their Chemistry and Non–Medical Uses, published by D. VanNostrand Co., Inc., New York, page 178.

Primary Examiner—Richard L. Hoff
Attorney—Jack D. Schaeffer and Richard C. Witte

[57] ABSTRACT

Compositions for inhibiting anomalous deposition and mobilization of calcium phosphates in animal tissue, comprising an effective amount of certain polyphosphonates as herein defined, and a pharmaceutical carrier; and a method for treating or preventing conditions involving pathological calcification and hard tissue demineralization in an animal comprising administering to such animal said compositions.

51 Claims, No Drawings

COMPOSITIONS FOR INHIBITING ANOMALOUS DEPOSITION AND MOBILIZATION OF CALCIUM PHOSPHATE IN ANIMAL TISSUE

CROSS-REFERENCE TO RELATED APPLICATIONS

This application is a continuation of the copending application of Marion D. Francis, Ser. No. 775,203, filed Nov. 12, 1968, which in turn is a continuation-in-part of application Ser. No. 717,995, filed Apr. 1, 1968, which in turn is a continuation-in-part of application Ser. No. 689,290, filed Dec. 11, 1967 all, now abandoned.

BACKGROUND OF THE INVENTION

This invention relates to novel compositions having therapeutic and/or prophylactic effects. The invention further relates to a novel method for treating or preventing certain pathological conditions in animals.

A number of pathological conditions which can afflict warm-blooded animals involve abnormal calcium and phosphate metabolism. Such conditions may be divided into two broad categories.

1. Conditions which are characterized by anomalous mobilization of calcium and phosphate leading to general or specific bone loss or excessively high calcium and phosphate levels in the fluids of the body. Such conditions are sometimes referred to herein as pathological hard tissue demineralizations.

2. Conditions which cause or result from deposition of calcium and phosphate anomalously in the body. These conditions are sometimes referred to herein as pathological calcifications.

The first category includes osteoporosis, a condition in which bone hard tissue is lost disproportionately to the development of new hard tissue. Marrow and bone spaces become larger, fibrous binding decreases, and compact bone becomes cancellous and fragile. Osteoporosis can be subclassified as menopausal, senile, drug induced (e.g., adrenocorticoid as can occur in steroid therapy), disease induced (e.g., arthritic and tumor), etc., however, the manifestations are essentially the same. Another condition in the first category is Paget's disease (osteitis deformans) which is also characterized by bone loss. In this disease, dissolution of normal bone occurs which is then replaced by soft, poorly mineralized tissue such that the bone becomes deformed from pressures of weight bearing, particularly in the tibia and femur. This condition also frequently sponsors pathological deposition of calcium and phosphate.

The second category, involving conditions manifested by anomalous calcium and phosphate deposition, includes such afflictions as arthritis, neuritis, bursitis, tendonitis and other inflammatory conditions which predispose involved tissue to deposition of calcium phosphates, and hormonal imbalance, (e.g., hyperparathyrodism, myositis ossificans progressiva, calcinosis universalis, resulting in calcification of soft tissues. Atherosclerosis is another condition in this category and involves degeneration and proliferate change in the intima which produces fibrous, lipoid plaques. If such plaques calcify, or if the inner walls of the arteries accumulate plaque and calcify, this condition is commonly referred to as arteriosclerosis.

Yet another condition in category (2) which results from anomalous calcium and phosphate deposition is stone or calculi formation in the bile duct, gall bladder, pancreas, salivary glands, tonsils, kidneys and bladder. Although some of such stones are not comprised primarily of calcium phosphate, it is likely that the original nidus is calcium phosphate. The formation of urinary calculi, i.e., urolithiasis, in cattle and sheep constitutes a major problem in veterinary medicine. It is estimated that from 5 percent to 10 percent of weanling calves suffer this affliction when they are taken off milk and start taking in other fluids.

As far as is known, no satisfactory medical treatment for the conditions of category (1) as described above has been developed prior to this invention although dietary control, fluorides, estrogens, and the hormone calcitonin (thyrocalcitonin) have been suggested or used for these conditions. Although certain inorganic phosphates such as pyrophosphates and longer chain condensed phosphates have been suggested for treatment of conditions in category (2), they have not been widely used because of their tendency to hydrolyze to the ineffective orthophosphate when administered to larger animals such as humans and cattle.

It is therefore an object of this invention to provide a composition for inhibiting anomalous deposition and mobilization of calcium phosphate in animal tissue.

It is a further object of this invention to provide an improved method for treatment of conditions involving pathological calcification and hard tissue demineralization in animals.

SUMMARY OF THE INVENTION

This invention is based on the discovery that certain polyphosphonic acids and their pharmaceutically acceptable salts reduce anomalous mobilization and deposition of calcium phosphates in animals. The invention thus involves a composition and method for treating or preventing conditions involving pathological demineralization of bony tissue and pathological calcium deposition in the soft tissue of animals. In its method aspect, the invention comprises administering to said animals an effective amount of a polyphosphonate as hereinafter characterized.

DETAILED DESCRIPTION OF THE INVENTION

In one of its aspects, this invention is a composition comprising an effective but non-toxic amount of polyphosphonic acid conforming to the structural formulas:

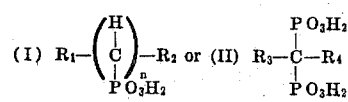

wherein $R_1$ and $R_2$ are each hydrogen or $CH_2OH$; $n$ is an integer of from 3 to 10; $R_3$ is hydrogen, alkyl containing from one to about 20 carbon atoms, alkenyl containing from two to about 20 carton atoms, aryl (e.g., phenyl and naphthyl), phenylethenyl, benzyl, halogen (e.g., chlorine, bromine, and fluorine), amino, substituted amino (e.g., dimethylamino, diethylamino, N-hydroxy-N-ethylamino, acetylamino), $-CH_2COOH$, $-CH_2PO_3H_2$, $-CH(PO_3H_2)(OH)$ or $-CH_2CH(PO_3$ H₂)₂; R₄ is hydrogen, lower alkyl (e.g., methyl, ethyl, propyl, and butyl), amino, benzyl, halogen (e.g., chlorine, bromine and fluorine), hydroxyl, —CH₂COOH, —CH₂PO₃H₂, or —CH₂CH₂PO₃H₂; or a pharmaceutically acceptable salt thereof such as alkali metal (e.g., sodium and potassium), alkaline earth metal (e.g., calcium and magnesium), non-toxic heavy metal (e.g., stannous and indium), and ammonium or low molecular weight substituted ammonium (e.g., mono-, di-, and tri-ethanolammonium) salts; and a pharmaceutical carrier. The above described polyphosphonic acids and their pharmaceutically acceptable salts are referred to collectively hereinafter as "polyphosphonates."

Operable polyphosphonates of the above formula (I) include propane-1,2,3-triphosphonic acid; butane-1,2,3,4-tetraphosphonic acid; hexane-1,2,3,4,5,6-hexaphosphonic acid; hexane-1-hydroxy-2,3,4,5,6-pentaphosphonic acid; hexane-1,6-dihydroxy-2,3,4,5-tetraphosphonic acid; pentane-1,2,3,4,5- pentaphosphonic acid; heptane-1,2,3,4,5,6,7-heptaphosphonic acid; octane-1,2,3,4,5,6,7,8-octaphosphonic acid, nonane-1,2,3,4,5,6,7,8,9-nonaphosphonic acid; decane-1,2,3,4,5,6,7,8,9,10-decaphosphonic acid; and the pharmaceutically acceptable salts of these acids, e.g., sodium potassium, calcium, magnesium, ammonium, triethanolammonium, diethanolammonium, and monoethanolammonium salts.

Among the operable polyphosphonates encompassed by the above formula (II) are ethane-1hydroxy-1,1-diphosphonic acid; methanediphosphonic acid; methanehydroxydiphosphonic acid; ethane-1,1,2-triphosphonic acid; propane-1,1,3,3-tetraphosphonic acid; ethane-2-phenyl-1,1-diphosphonic acid; ethane-2-naphthyl-1,1-diphosphonic acid; methanephenyldiphosphonic acid; ethane-1-amino-1,1-diphosphonic acid; methanedichlorodiphosphonic acid; nonane-5,5-diphosphonic acid; n-pentane-1,1-diphosphonic acid; methanedifluorodiphosphonic acid; methanedibromodiphosphonic acid; propane-2,2-diphosphonic acid; ethane-2-carboxy-1,1-diphosphonic acid; propane-1-hydroxy-1,1,3-triphosphonic acid; ethane-2-hydroxy-1,1,2-triphosphonic acid; ethane-1-hydroxy-1,1,2-triphosphonic acid; propane-1,3-diphenyl-2,2-diphosphonic acid; nonane-1,1-diphosphonic acid; hexadecane-1,1-diphosphonic acid; pent-4-ene-1-hydroxy-1,1-diphosphonic acid; octadec-9-ene-1-hydroxy-1,1-diphosphonic acid; 3-phenyl-1,1-diphosphono-prop-2-ene; octane-1,1-diphosphonic acid; dodecane-1,1-diphosphonic acid; phenylaminomethanediphosphonic acid; naphthylaminomethanediphosphonic acid; N,N-dimethylaminomethanediphosphonic acid; N-(2-hydroxyethyl)-aminomethanediphosphonic acid; N-acetylaminomethanediphosphonic acid; aminomethanediphosphonic acid; and the pharmaceutically acceptable salts of these acids, e.g., sodium potassium, calcium, magnesium, stannous, indium, ammonium, triethanolammonium, diethanolammonium, and monoethanolammonium salts.

Mixtures of any of the foregoing phosphonic acids and/or salts can be used in the practice of this invention.

Ethane-1-hydroxy-1,1-diphosphonic acid, an especially preferred polyphosphonate, has the molecular formula $CH_3C(OH)(PO_3H_2)_2$. (According to nomenclature by radicals, the acid might also be named 1-hydroxyethylidene diphosphonic acid.) The most readily crystallizable salt of this acid is obtained when three of the acid hydrogens are replaced by sodium. Preferred salts for the purpose of this invention are the trisodium hydrogen salt which has the structure:

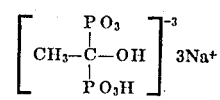

and the disodium dihydrogen salt.

The trisodium hydrogen salt normally crystallizes as the hexahydrate which loses some water during air-drying to yield a mixture of the hexa- and monohydrate averaging 3 to 4 molecules of water of hydration.

While any pharmaceutically acceptable salt of ethane-1-hydroxy-1,1-diphosphonic acid can be used in the practice of this invention, the tetrasodium salt, the trisodium hydrogen salt, the disodium dihydrogen salt, the monosodium trihydrogen salt, and the mixtures thereof are preferred. The other sodium, potassium, ammonium, and mono-, di-, and tri-ethanolammonium salts and mixtures thereof are also suitable, provided caution is observed in regulating the total intake of caption species in the salt composition. These compounds can be prepared by any suitable method, however, an especially preferred method is disclosed in copending application Ser. No. 553,648, filed May 31, 1966, by Oscar T. Quimby et al., now U.S. Pat. No. 3,400,149.

Methanehydroxydiphosphonic acid and related compounds operable herein can be prepared, for example, by reaction of phosgene with an alkali metal dialkylphosphite. A complete description of these compounds and the method for preparing same is found in copending patent application Ser. No. 517,073, filed Dec. 29, 1965, by Oscar T. Quimby, now U.S. Pat. No. 3,422,137.

Methanediphosphonic acid and related compounds useful herein are described in detail in U.S. Pat. No. 3,213,030, granted Oct. 19, 1965. A preferred method of preparing such compounds is disclosed in U.S. Pat. No. 3,251,907, granted May 17, 1966.

Ethane-1,1,2-triphosphonic acid and related compounds which can be used in the compositions of this invention, as well as a method for their preparation, are fully described in copending patent application Ser. No. 602,161, filed Dec. 16, 1966, by Oscar T. Quimby, now U.S. Pat. No. 3,551,339.

Propane-1,1,3,3-tetraphosphonic acid and related compounds useful herein, and a method for preparing same are fully disclosed in copending application Ser. No. 507,662, filed Nov. 15, 1965, by Oscar T. Quimby, now U.S. Pat. No. 3,400,176.

Pentane-2,2-diphosphonic acid and related compounds can be prepared in accordance with the method described by G. M. Kosolopoff in J. Amer. Chem. Soc., 75, 1500 (1953).

Propane-1,2,3-triphosphonic acid and salts thereof can be prepared by a process disclosed in the copending application of D. Allan Nicholson and Darrel Campbell, Ser. No. 694,002, filed Dec. 27, 1967, now abandoned.

Butane-1,2,3,4-tetraphosphonic acid and salts thereof can be prepared by a process disclosed in the copending application of D. Allan Nicholson and Darrel Campbell, Ser. No. 694,003, filed Dec. 27, 1967, now abandoned.

The higher aliphatic vicinal polyphosphonates and salts thereof can be prepared by the process disclosed in the copending application of D. Allan Nicholson and Darrel Campbell, Ser. No. 693,898, filed Dec. 27, 1967, now U.S. Pat. No. 5,584,035.

The required dosage of polyphosphonate will vary with the particular condition being treated, the severity of the condition, the duration of treatment, and the specific polyphosphonate employed; however, single dosages can range from 0.01 to 500 mg. per kilogram of body weight, preferably 0.5 to 50 mg/kg (unless otherwise specified, the unit designated "mg/kg" as used herein refers to mg/kg of body weight), with up to four dosages daily. The higher dosages within this range are, of course, required in the case of oral administration because of limited absorption. Dosages greater than about 500 mg/kg may produce toxic symptoms and should be avoided. Moreover, daily dosages greater than about 2,000 mg/kg are not required to produce the desired effect and may produce toxic side effects. Dosages of less than about 0.01 mg/kg do not materially affect pathological calcification or demineralization, even administered intravenously. Preferably, dosages ranging from 0.5 to 50 mg/kg are employed when the polyphosphonates are administered orally. Table 1 below sets forth preferred dosages for various conditions which can be treated in accordance with this invention:

TABLE 1

| Condition | Oral dosage (mg/kg) Up to four times/day* |
|---|---|
| Osteoporosis (menopausal) | 1–25 |
| Osteoporosis (senile et al.) | 1–25 |
| Paget's Disease | 10–50 |
| Arthritis | 1–25 |
| Bursitis | 1–25 |
| Neuritis | 1–25 |
| Stones | 1–25 |

(*A larger initial dosage may be required, e.g., up to 500 mg/kg followed by the specified dosage level.)

The polyphosphonate can also be administered parenterally in aqueous solution by subcutaneous, intradermal, intramuscular or intravenous injection. The preferred dosage ranges by these modes of administration are as follows:

| Subcutaneous | 0.1–10 mg/kg |
| Intradermal | 0.1–10 mg/kg |
| Intramuscular | .05–5 mg/kg |
| Intravenous | .05–5 mg/kg |

For purposes of oral administration the polyphosphonates can be formulated in the form of capsules, tablets or granules. For treatment of non-human animals, the polyphosphonates are preferably incorporated in animal feed, feed supplements or feed concentrates. They can also be prepared in unit dosage form together with a pharmaceutical carrier, each unit dosage form containing from 15 mg to 10 g of polyphosphonate. The preferred concentration range of polyphosphonate in unit dosage forms intended for use by humans and smaller domesticated animals is from 15 mg to 1,000 mg, more preferably 100 mg to 500 mg. A higher concentration range, i.e., from 1 g to 5 g is preferred in unit dosage forms intended for treatment of larger animals such as cattle, horses, etc.

When administered orally, the compositions of this invention are preferably in a form adapted to minimal exposure of the polyphosphonates to the oral cavity. Although these compounds do not damage dental enamel when applied to the tooth surfaces at the relatively low concentrations typical of toothpaste, mouthwash, lozenges and the like intended for dental calculus prophylaxis, the substantially higher concentrations of polyphosphonates provided in the unit dosage form embodiments of this invention may demineralize dental enamel on repeated prolonged exposure. Thus oral administration is preferably effected with such unit dosage forms as capsules, pills, and tablets which are promptly ingested. Troches, chewable tablets and the like which typically remain in the oral cavity for a substantial time prior to ingestion are preferably avoided.

As used herein, the term "pharmaceutical carrier" denotes a solid or liquid filler diluent or encapsulating substance. Some examples of the substances which can serve as pharmaceutical carriers are sugars such as lactose, glucose and sucrose; starches such as corn starch and potato starch; cellulose and its derivatives, such as sodium carboxymethylcellulose, ethylcellulose, cellulose acetate; powered tragacanth; malt; gelatin, talc; stearic acid; magnesium stearate; calcium sulfate; vegetable oils, such as peanut oil, cottonseed oil, sesame oil, olive oil, corn oil and oil of theobroma; polyols such as propylene glycol, glycerin, sorbitol, mannitol, and polyethylene glycol; agar; alginic acid; pyrogen-free water; isotonic saline; and phosphate buffer solutions, as well as other non-toxic compatible substances used in pharmaceutical formulations. Wetting agents and lubricants such as sodium lauryl sulfate, as well as coloring agents, flavoring agents and preservatives, can also be present.

The pharmaceutical carrier employed in conjunction with the polyphosphonates is used at a concentration sufficient to provide a practical size to dosage relationship. Preferably, the pharmaceutical carrier comprises from about 0.1 percent to 99 percent by weight of the total composition.

Animal feed compositions to which the polyphosphonates of this invention can be added generally include as feedstuffs a cellulosic roughage component such as hay, straw, cottonseed hulls, beet pulp, silage, ground corn cobs, corn stalks, etc. Protein-containing components such as whole grains, including corn, wheat, barley, oats, rye, millet and alfalfa; processed grains, including cottonseed meal, corn meal, soybean meal, linseed meal and other waste products from the oil expressing industry; animal protein including casein, gelatin, fish meal, and slaughterhouse wastes, are also required feedstuffs for a nutrionally balanced feed composition. Animal feed compositions can also contain natural oils, including animal fats, such as beef tallow, mutton tallow; fish oils, including eel, herring, menhaden, tuna and salmon oil; and whale oil. Vegetable oils such as soybean oil, sunflower oil, olive oil, safflour oil, corn oil, peanut oil, cottonseed oil, rice oil, millet oil, wheat germ oil and palm oil, can also be used.

In addition to the feedstuffs mentioned above, animal feed compositions can include supplemental sources of minerals, such as bone meal, salt, and the various trace minerals, such as salts of zinc, copper, manganese, magnesium, cobalt, iodine and iron. Antibiotics, steroids, anthelmintics and other medicants or growth stimulating substances can be incorporated in animal feeds. Various vitamins can be added to animal feed compositions to provide for deficiencies incident to the selection of other feed components. Other feedstuffs can be included such as casein, other milk by-products, and synthetic nitrogen sources such as urea.

The polyphosphonates can be incorporated in the total feed composition as described above or in intermediate feed concentrates or feed supplements which are adapted to be blended with the basic roughage and protein feedstuffs to prepare the final feed. In the feed industry the term "concentrate" is often used to denote a product which contains a relatively large quantity of one or more nutrients, such as high quality protein, minerals, vitamins and the like and which is adapted for addition to the basic feedstuffs to form a total or final feed. The term "supplement" is also used to denote a specific feedstuff or mixture thereof that is either added to or included in the concentrate portion of the total feed, or in the total feed itself. The polyphosphonates can be employed in accordance with this invention by incorporating same in feed supplements, concentrates or the total feed composition (all referred to hereinafter as "feed compositions").

Feed compositions containing a minor proportion of one or more of the polyphosphonates described herein incorporated in a major proportion of an animal foodstuff constitute a preferred embodiment of this invention inasmuch as they provide an effective and practical means of urolithiasis prophylaxis for large herds of animals, especially during periods of feed-lot maintenance or limited grazing. Urolithiasis prophylaxis can be achieved in grazing herds by incorporating the polyphosphonates in block salt.

The concentration of polyphosphonate in feed compositions will of course vary with the weight of the animal to be treated and the proportion of the total diet which the feed composition comprises. When herds of animals are to be treated, the level of polyphosphonate in the feed composition should be sufficient to provide the dosages specified herein based on the average feed consumption and weigh of the animals. In any event, the polyphosphonates comprise a minor proportion of the total feed composition.

While it is not intended that this invention be limited by a particular theory of operation, in the case of those conditions which cause or result from deposition of calcium and phosphate anomalously in the body, it is believed that the polyphosphonates interfere with the conversion of X-ray amorphous calcium phosphate to crystalline calcium hydroxylapatite and thus greatly reduce or prevent the formation of calcium phosphate deposits. Although certain inorganic polyphosphates also inhibit crystal growth soon after administration to an animal, they are hydrolyzed to the orthophosphate species which has no crystal growth inhibition properties and, in fact, can itself take part in hydroxylapatite formation. The polyphosphonates of this invention, on the other hand, are stable to hydrolysis and remain active after administration, even to larger animals such as cattle.

CRYSTAL GROWTH INHIBITION TEST

The efficacy of the polyphosphonates of this invention in inhibiting crystal growth is demonstrated by the Crystal Growth Inhibition Test which is conducted as follows:

1 ml. of a 0.1 M stock solution of $NaH_2PO_4 \cdot H_2O$ is diluted with 22 ml. of distilled water. 1 ml. of an aqueous solution of the polyphosphonate to be tested (at a concentration sufficient to provide the desired ultimate concentration in the reaction mixture) is added to the diluted $NaH_2PO_4$ solution and the solution is adjusted to pH 7.4 with sodium hydroxide. To this solution is added 1 ml. of a 0.1 M solution of $CaCl_2 \cdot 2H_2O$ pre-adjusted to pH 7.4 with sodium hydroxide. This mixture is held at a constant pH 7.4 throughout the reaction period.

After a sufficient reaction time as determined by the operator, generally with 90 minutes, the solution is filtered through a $0.45\mu$ Millipore filter pad. The precipitate is air-dried and analyzed by X-ray diffraction. The solid calcium phosphate precipitated from the above-described solution without a polyphosphonate gives a typical hydroxylapatite pattern, while the calcium phosphate precipitated under the same conditions but in the presence of small amounts of the polyphosphonates of this invention is amorphous to X-rays.

Those compounds which were effective in inhibiting the growth of hydroxylapatite crystals at concentrations of less than $1.5 \times 10^{-3}$ M under the conditions of this test are found to inhibit anomalous mobilization and deposition of calcium phosphates in animal tissue, while several compounds outside the scope of this invention that have little or no effect in this test are ineffective in vivo.

Table 2 below shows the concentration of various preferred polyphosphonates required to inhibit the formation of calcium hydroxylapatite under the conditions specified above.

TABLE 2

| Compound | M Concentration for Inhibition |
| --- | --- |
| Ethane-1-hydroxy-1,1-diphosphonic acid, trisodium salt | $2.00 \times 10^{-4}$ |
| Methanediphosphonic acid, trisodium salt | $1.81 \times 10^{-4}$ |
| Methanehydroxydiphosphonic acid, disodium salt | $2.04 \times 10^{-4}$ |
| Ethane-1,1,2-triphosphonic acid, tetrasodium salt | $2.00 \times 10^{-4}$ |
| Propane-1,1,3,3-tetraphosphonic acid, hexasodium salt | $1.16 \times 10^{-3}$ |
| Ethane-1-amino-1,1-diphosphonic acid | $1.00 \times 10^{-4}$ |
| Methanedichlorodiphosphonic acid, trisodium salt | $2.00 \times 10^{-4}$ |
| Nonane-5,5-diphosphonic acid | $2.00 \times 10^{-4}$ |
| n-Pentane-1,1-diphosphonic acid | $2.00 \times 10^{-4}$ |

| | |
|---|---|
| Methanedibromodiphosphonic acid | $5.04 \times 10^{-5}$ |
| Ethane-2-carboxy-1,1-diphosphonic acid, tetrasodium salt | $2.26 \times 10^{-4}$ |
| Nonane-1,1-diphosphonic acid disodium salt | $2.01 \times 10^{-4}$ |
| 3-Phenyl-1,1-diphosphono-prop-2-ene, disodium salt | $2.04 \times 10^{-4}$ |
| Propane-1-hydroxy-1,1,3-triphosphonic acid, pentasodium salt | $1.02 \times 10^{-4}$ |
| Ethane-1-hydroxy-1,1,2-triphosphonic acid, pentasodium salt | $1.13 \times 10^{-3}$ |
| Ethane-2-hydroxy-1,1,2-triphosphonic acid, pentasodium salt | $1.05 \times 10^{-3}$ |
| Methaneaminodiphosphonic acid | $2.00 \times 10^{-4}$ |
| phenylaminomethanedipbsonic acid | $2.60 \times 10^{-5}$ |
| N,N-dimethylaminomethanediphosphonic acid | $5.00 \times 10^{-5}$ |
| N-(2-hydroxyethyl)-aminomethanediphosphonic acid | $5.20 \times 10^{-5}$ |
| N-acetylaminomethanediphosphonic acid | $5.20 \times 10^{-5}$ |
| Propane-1,2,3-triphosphonic acid | $2.32 \times 10^{-4}$ |
| Butane-1,2,3,4-tetraphosphonic acid | $2.04 \times 10^{-4}$ |
| Hexane-1,2,3,4,5,6-hexaphosphonic acid | $2.22 \times 10^{-4}$ |

The presence of the specified amounts of the polyphosphonates of Table 2 in the test solutions of the Crystal Growth Inhibition Test results in the formation of an amorphous calcium phosphate rather than crystalline calcium hydroxylapatite as occurs without polyphosphonate and the total formation of calcium orthophosphate is greatly decreased.

The capacity of the polyphosphonates of this invention to inhibit anomalous calcification was also demonstrated in vivo as follows:

This test is based on the observation that massive dosages of vitamin $D_3$ induces extensive calcification in the aorta of rats [see Gillman et al., J. Exp. Path., 40:1 (1960)]. Female Wistar rats each weighing 150 to 200 g. were randomly divided into a control group of 60 animals and test groups each containing 10 animals. The animals were kept in a thermostabilized room at 22° C and received a normal diet and tap water ad libitum throughout the test period. All of the animals were given daily doses of 75,000 units/kg. of vitamin $D_3$ via stomach tube for five days beginning on the third and ending on the seventh day of the test. Beginning on the first day (prior to the first dosage of vitamin $D_3$) until the conclusion of the test, the test groups of animals were administered specified dosages of various polyphosphonates, orally by stomach tube and subcutaneously, respectively, once per day. In each case, the polyphosphonates were dissolved in 0.9 percent NaCl when given at the lower dose, and in distilled water when given at the higher dosage. The solution was adjusted to pH 7.4 and the amount of solution given was 2 ml/kg of body weight. On the 15th day the animals were sacrificed and their aortas were dissected and dried for 48 hours at 120° C. After determination of the dry weight, the aortas were ashed in a muffle oven at 800° C for 6 hours. The residue was dissolved in 0.2 N HCl and the calcium was titrated with EDTA using calcichrome as an indicator in a titration photometer, all in accordance with the methods described by Irving et al., Proc. Soc. Exp. Biol. Med., 122, No. 3, 852 (1966). The results of administering representative polyphosphonates in accordance with this invention are set forth in Table 3 below.

TABLE 3

| Compound | Dosage Conc. mg/kg. | Mode of Administration | Aorta Calcium μg Ca/mg Dry Aorta | % Reduction |
|---|---|---|---|---|
| Disodium salt of methanediphosphonic acid | 3.55 | Oral | 21 | 69.1 |
| | 35.5 | Oral | 3 | 95.6 |
| | 3.55 | Subcutaneous | 21 | 69.1 |
| | 35.5 | Subcutaneous | 2 | 97.1 |
| Disodium salt of methanedichlordct acid | 4.66 | Oral | 43 | 36.8 |
| | 46.6 | Oral | 2 | 97.1 |
| | 4.66 | Subcutaneous | 5 | 92.6 |
| | 46.6 | Subcutaneous | 4 | 94.1 |
| Disodium salt of ethane-1-amino-1,1-diphosphonic acid | 3.99 | Oral | 46 | 32.4 |
| | 39.9 | Oral | 47 | 30.9 |
| | 3.99 | Subcutaneous | 15 | 77.9 |
| | 39.9 | Subcutaneous | 4 | 94.1 |
| Disodium salt of methanehydroydiphosphonic acid | 3.81 | Oral | 66 | 2.9 |
| | 38.1 | Oral | 55 | 19.1 |
| | 3.81 | Subcutaneous | 5 | 92.6 |
| | 38.1 | Subcutaneous | 5 | 92.6 |
| Disodium salt of ethane-1-hydroxy-1,1-diphosphonic acid | 4.04 | Oral | 61 | 10.3 |
| | 40.4 | Oral | 3 | 95.6 |
| | 4.04 | Subcutaneous | 18 | 73.5 |
| | 40.4 | Subcutaneous | 2 | 97.1 |
| Tetrasodium salt of ethane-1-hydroxy-1,1,2-triphosphonic acid | 4.02 | Oral | 64 | 5.9 |
| | 40.2 | Oral | 54 | 20.6 |
| | 4.02 | Subcutaneous | 70 | - |
| | 40.2 | Subcutaneous | 19 | 72.1 |
| Hexasodium salt of propane-1,1,3,3-tetraphosphonic acid | 4.00 | Oral | 41 | 39.7 |
| | 40.0 | Oral | 58 | 14.7 |
| | 4.00 | Subcutaneous | 39 | 42.8 |
| | 40.0 | Subcutaneous | 11 | 83.8 |
| Control | 0 | | 68 | |

The calcium and % reduction values set forth in the above table are averages of the values secured on each of the 10 animals in the particular group, except the control value which is based on 60 animals.

A second control group of 20 untreated normal animals was used to establish the aorta calcium level in healthy normal animals and was found to be 7μg Ca/mg dry weight of aorta.

It can be seen that several representative compositions of this invention materially reduce vitamin $D_3$-induced calcification in the aorta of rats.

EXAMPLE I

Capsules are prepared by conventional methods, comprised as follows:

| Ingredient | mg per capsule |
|---|---|
| Ethane-1-hydroxy-1,1-diphosphonic acid | 350.00 |
| Starch | 55.60 |
| Sodium lauryl sulfate | 2.90 |

The above capsules administered orally twice daily substantially reduces bone decalcification in a patient weighing approximately 70 kilograms afflicted with osteoporosis. Similar results are attained when methanediphosphonic acid, methanedichlorodiphosphonic acid, methanehydroxydiphosphonic acid, ethane-1-amino-1,1-diphosphonic acid, phenylaminomethanediphosphonic acid, N,N-dimethylaminomethanediphosphonic acid, N-(2-hydroxyethyl)-aminomethanediphosphonic acid, N-acetylaminomethanediphosphonic acid, aminomethanediphosphonic acid, hexane-1,2,3,4,5,6-hexaphosphonic acid, and pent-4-ene-1-hydroxy-1,1-diphosphonic acid, respectively, are employed in the above described capsule in place of ethane-1-hydroxy-1,1-diphosphonic acid.

EXAMPLE II

Tablets are prepared by conventional methods, formulated as follows:

| Ingredient | mg per tablet |
|---|---|
| Methanediphosphonic acid | 25.00 |
| Lactose | 40.00 |
| Starch | 2.50 |
| Magnesium stearate | 1.00 |

When administered orally four times daily, the above composition significantly reduces the formation of renal calculi in a patient weighing approximately 50 kilograms, having a predisposition to such formation.

Similar results are achieved with tablets formulated as above but replacing methanediphosphonic acid with the disodium salt of ethane-1-hydroxy-1,1-diphosphonic acid, the trisodium salt of methanediphosphonic acid; the disodium salt of methanehydroxydiphosphonic acid, aminomethanediphosphonic acid, the monocalcium salt of methanedichlorodiphosphonic acid, napthylaminomethanediphosphonic acid, propane-1,2,3-triphosphonic acid; the pentasodium salt of butane-1,2,3,4-tetraphosphonic acid, the monoindium salt of octadec-9-ene-1-hydroxy-1,1-diphosphonic acid, the monostannous salt of hexadecane-1,1-diphosphonic acid, and propane-1,1,-diphosphonic acid, respectively.

The lactose employed in this example is replaced by sucrose and the magnesium stearate by sodium carboxymethylcellulose without affecting the desired properties of the tablet.

Additional tablet compositions are prepared in accordance with the invention as follows:

| Ingredient | Ex. III | IV | V | VI | VII | VIII | IX |
|---|---|---|---|---|---|---|---|
| Tetrasodium salt of ethane-1,1,2-triphosphonic acid | 80.0 | | | | | | |
| Pentasodium salt of propane1-hydroxy-1,1,2-roiphosphonic acid | | 100.0 | | | | | |
| Dimagnesium salt of propane-1,1,3,3-tetraphosphonic acid | | | 120.0 | | | | |
| Pentasodium salt of ethane-1-hydroxy-1,1-diphosphonic acid | | | | 50.0 | | 25.0 | |
| Pentasodium salt of ethane-2-hydroxy-1,1-diphosphonic acid | | | | | 85.0 | | 25.0 |
| Nonane-5,5-diphosphonic acid | | | | | | 30.0 | |
| Lactose | 97.0 | 31.0 | 31.0 | 73.0 | 97.0 | 30.0 | 30.0 |
| Starch | 45.0 | 13.0 | 13.0 | 57.0 | 45.0 | | |
| Stearic acid | | | 6.0 | | | | |
| Talc | 35.5 | 6.5 | 6.5 | 9.0 | 35.0 | 5.0 | 5.0 |
| Calcium stearate | | 1.0 | 1.0 | | | 1.0 | 1.0 |
| Ethyl cellulose | | 16.0 | 16.0 | | | 15.0 | 15.0 |

Solutions for parenteral administration are prepared by dissolving the following phosphonates in distilled water at the specified concentration, adjusting the pH to 7.4 with the base corresponding to the indicated salt form, or sodium hydroxide in the case of the acids and sterilizing same by standard sterilization techniques.

| Ex. | Phosphonate | Conc. mg/ml |
|---|---|---|
| X | Disodium salt of ethane-1-hydroxy-1,1-diphosphonic acid | 10.0 |
| XI | Monopotassium salt of ethane-1-hydroxy-1,1-diphosphonic acid | 15.0 |
| XII | Diammonium salt of ethane-1-hydroxy-1,1-diphosphonic acid | 5.0 |
| XIII | Bis(triethanolammonium) salt of ethane-1-hydroxy-1,1-diphosphonic acid | 25.0 |
| XIV | Disodium salt of propane-2,2-diphosphonic acid | 13.0 |
| XV | Diammonium salt of ethane-2-carboxy-1,1-diphosphonic acid | 18.0 |
| XVI | n-Pentane-1,1-diphosphonic acid | 8.0 |
| XVII | Disodium salt of n-nonane-1,1-diphosphonic acid | 24.0 |
| XVIII | 3-Phenyl-1,1-diphosphonoprop-2-ene | 6.0 |
| XIX | Monoammonium salt of propane-1-hydroxy-1,1,3-triphosphonic acid | 17.0 |
| XX | Monomagnesium salt of ethane-2-hydroxy-1,1,3-triphosphonic acid | 23.0 |
| XXI | Propane-1,3-diphenyl-2,2-diphosphonic acid | 8.0 |
| XXII | Propane-1,2,3-triphosphonic acid | 25.0 |

The solutions of the foregoing examples when administered by injection to animals in an amount sufficient to provide desired dosage levels as hereinbefore specified substantially reduces pathological calcification and hard tissue demineralization. Preferably, the solutions are packaged in sealed ampules for single dosage hypodermic injections.

EXAMPLE XXIII

A complete feed composition embodying the present invention is prepared by grinding and mixing the following:

| Component | Parts by Weight |
|---|---|
| Timothy hay | 960 |
| Dehydrated alfalfa | 40 |
| Yellow Corn | 600 |
| Corn starch | 310 |
| Iodized salt | 10 |
| Bone meal | 20 |

| | |
|---|---|
| Sea salt | 2 |
| Soybean meal | 30 |
| Biuret | 28 |
| Disodium salt of ethane-1-hydroxy-1,1-diphosphonic acid | .694 |

This composition is fed to 400 pound weanling steers at the rate of approximately 12 pounds per day. The average dosage of polyphosphonate effected in this manner is about 1.8 g per day. Animals placed on this feed experience a substantially lower incidence of urolithiasis than control animals receiving the same feed but without polyphosphonate.

Similar results are attained when methanediphosphonic acid, methanedichlorodiphosphonic acid, methanehydroxydiphosphonic acid, ethane-1-amino-1,1-diphosphonic acid, phenylaminomethanediphosphonic acid, N,N-dimethylaminomethanediphosphonic acid, N-(2-hydroxyethyl)-aminomethanediphosphonic acid, N-acetylaminomethanediphosphonic acid, aminomethanediphosphonic acid, hexane-1,2,3,4,5,6-hexaphosphonic acid, and pent-4-ene-1-hydroxy-1,1-diphosphonic acid, respectively, are employed in the above described feed composition in place of the disodium salt of ethane-1-hydroxy-1,1-diphosphonic acid.

EXAMPLE XXIV

A supplementary feed concentrate is prepared by intimately admixing the following:

| Component | Parts by Weight |
|---|---|
| Biuret | 400 |
| Brewers dried grains | 25 |
| Dehydrated alfalfa | 43 |
| Iodized salt | 10 |
| Tricalcium phosphate | 2 |
| Methanediphosphonic acid | 4 |

This composition is suitable for mixing with silage, grain hay, ground grain and the like for preparing total feed compositions for ruminant livestock. When fed as a supplement to legumes consumed by grazing weanling lambs at the rate of 0.25 pounds per day, this supplement greatly reduces the incidence of urolithiasis.

Similar results are achieved with a feed concentrate formulated as above but replacing methanediphosphonic acid with the disodium salt of ethane-1-hydroxy-1,1-diphosphonic acid, the trisodium salt of methanediphosphonic acid; the disodium salt of methanehydroxydiphosphonic acid, aminomethanediphosphonic acid, the monocalcium salt of methanedichlorodiphosphonic acid, napthylaminomethanediphosphonic acid, propane-1,2,3-triphosphonic acids; the pentasodium salt of butane-1,2,3,4-tetraphosphonic acid, the monindium salt of octadec-9-ene-1-hydroxy-1,1-diphosphonic acid, the monostannous salt of hexadecane-1,1 diphosphonic acid, and propane-1,1-diphosphonic acid, respectively.

What is claimed is:

1. A composition in dosage unit form for inhibiting deposition and mobilization of calcium phosphate in animal tissue comprising (1) an effective but non-toxic amount, within the range from about 15 mg. to about 1,000 mg., of a polyphosphonate selected from the group consisting of

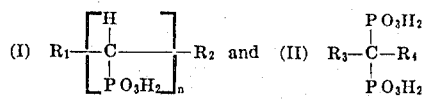

wherein $R_1$ and $R_2$ are each hydrogen or $CH_2OH$; $n$ is an integer of from 3 to 10; $R_3$ is hydrogen, alkyl containing from one to about 20 carbon atoms, alkenyl containing from two to about 20 carbon atoms, phenyl, naphthyl, phenylethenyl, benzyl, halogen, amino, substituted amino, $-CH_2COOH$, $-CH_2PO_3H_2$, $-CH(PO_3H_2-CH_2CH(PO_3H_2)_2$; $R_4$ is hydrogen, lower alkyl, amino, benzyl, halogen, hydroxyl, $-CH_2COOH$, $-CH_2PO_3H_2$, or $-CH_2CH_2PO_3H_2$; and the pharmaceutically acceptable salts thereof, and (2) a pharmaceutical carrier, said composition being adapted to systemic administration to animals.

2. The composition of claim 1 wherein the polyphosphonate is methanehydroxydiphosphonic acid or a pharmaceutically acceptable salt thereof.

3. The composition of claim 1 wherein the polyphosphonate is ethane-1-amino-1,1-diphosphonic acid or a pharmaceutically acceptable salt thereof.

4. The composition of claim 1 wherein the polyphosphonate is methanediphosphonic acid or a pharmaceutically acceptable salt thereof.

5. The composition of claim 1 wherein the polyphosphonate is ethane-1-hydroxy-1,1,2-triphosphonic acid or a pharmaceutically acceptable salt thereof.

6. The composition of claim 1 wherein the polyphosphonate is propane-1,2,3-triphosphonic acid or a pharmaceutically acceptable salt thereof.

7. The composition of claim 1 wherein the polyphosphonate is butane-1,2,3,4-tetraphosphonic acid or a pharmaceutically acceptable salt thereof.

8. The composition of claim 1 wherein the polyphosphonate is hexane-1,2,3,4,5,6-hexaphosphonic acid or a pharmaceutically acceptable salt thereof.

9. The composition of claim 1 wherein the polyphosphonate is methanephenylaminodiphosphonic acid or a pharmaceutically acceptable salt thereof.

10. The composition of claim 1 wherein the dosage unit form is adapted to oral administration.

11. The composition of claim 1 wherein the polyphosphonate is methanedichlorodiphosphonic acid or a pharmaceutically acceptable salt thereof.

12. The composition of claim 11 wherein the dosage unit form is adapted to oral administration and comprises from about 100 mg. to about 500 mg. of polyphosphonate.

13. The composition of claim 1 wherein the polyphosphonate is ethane-1-hydroxy-1,1-diphosphonic acid or a pharmaceutically acceptable salt thereof.

14. The composition of claim 13 wherein the dosage unit form is adapted to oral administration and comprises from about 100 mg. to about 500 mg. of polyphosphonate.

15. A method for inhibiting anomalous deposition or mobilization of calcium phosphates in animal tissue which comprises systemically administering to animals an effective but non-toxic amount of a polyphosphonate selected from the group consisting of $$(I)\ R_1 \left[ \begin{array}{c} H \\ | \\ C \\ | \\ PO_3H_2 \end{array} \right]_n R_2 \quad \text{and} \quad (II)\ R_3 - \begin{array}{c} PO_3H_2 \\ | \\ C - R_4 \\ | \\ PO_3H_2 \end{array}$$

wherein $R_1$ and $R_2$ are each hydrogen or $CH_2OH$; $n$ is an integer of from 3 to 10; $R_3$ is hydrogen, alkyl containing from one to about 20 carbon atoms, alkenyl containing from two to about 20 carbon atoms, phenyl, naphthyl, phenylethenyl, benzyl, halogen, amino, substituted amino, $-CH_2COOH$, $-CH_2PO_3H_2$, $-CH(PO_3H_2-CH_2CH(PO_3H_2)_2$; $R_4$ is hydrogen, lower alkyl, amino, benzyl, halogen, hydroxyl, $-CH_2COOH$, $-CH_2PO_3H_2$, or $-CH_2CH_2PO_3H_2$; and the pharmaceutically acceptable salts thereof, and a pharmaceutical carrier.

16. The method of claim 15 wherein the polyphosphonate is methanedichlorodiphosphonic acid.

17. The method of claim 15 wherein the polyphosphonate is ethane-1-hydroxy-1,1-diphosphonic acid.

18. The method of claim 15 wherein the polyphosphonate is methanehydroxydiphosphonic acid.

19. The method of claim 15 wherein the polyphosphonate is ethane-1-amino-1,1-diphosphonic acid.

20. The method of claim 15 wherein the polyphosphonate is methanediphosphonic acid.

21. The method of claim 15 wherein the polyphosphonate is ethane-1-hydroxy-1,1,1-triphosphonic acid.

22. The method of claim 15 wherein the polyphosphonate is propane-1,2,3-triphosphonic acid.

23. The method of claim 15 wherein the polyphosphonate is butane-1,2,3,4-tetraphosphonic acid.

24. The method of claim 15 wherein the polyphosphonate is hexane-1,2,3,4,5,6-hexaphosphonic acid.

25. The method of claim 15 wherein the polyphosphonate is methanephenylaminodiphosphonic acid.

26. An animal feed composition comprising (1) a minor proportion of a polyphosphonate selected from the group consisting of $$(I)\ R_1 \left[ \begin{array}{c} H \\ | \\ C \\ | \\ PO_3H_2 \end{array} \right]_n R_2 \quad \text{and} \quad (II)\ R_3 - \begin{array}{c} PO_3H_2 \\ | \\ C - R_4 \\ | \\ PO_3H_2 \end{array}$$

wherein $R_1$ and $R_2$ are each hydrogen or $CH_2OH$; $n$ is an integer from 3 to 10; $R_3$ is hydrogen, alkyl containing from one to about 20 carbon atoms, alkenyl containing from two to about 20 carbon atoms, phenyl, naphthyl, phenylethenyl, benzyl, halogen, amino, substituted amino, $-CH_2COOH$, $-CH_2PO_3H_2$, $-CH(PO_3H_2-CH_2CH(PO_3H_2)_2$; $R_4$ is hydrogen, lower alkyl, amino, benzyl, halogen, hydroxyl, $-CH_2COOH$, $-CH_2PO_3H_2$, or $-CH_2CH_2PO_3H_2$; and the pharmaceutically acceptable salts thereof, and (2) a major proportion of animal foodstuff.

27. The composition of claim 26 wherein the polyphosphonate is methanedichlorodiphosphonic acid or a pharmaceutically acceptable salt thereof.

28. The composition of claim 26 wherein the polyphosphonate is ethane-1-hydroxy-1,1-diphosphonic acid or a pharmaceutically acceptable salt thereof.

29. The composition of claim 26 wherein the polyphosphonate is methanehydroxydiphosphonic acid or a pharmaceutically acceptable salt thereof.

30. The composition of claim 26 wherein the polyphosphonate is ethane-1-amino-1,1-diphosphonic acid or a pharmaceutically acceptable salt thereof.

31. The composition of claim 26 wherein the polyphosphonate is methanediphosphonic acid or a pharmaceutically acceptable salt thereof.

32. The composition of claim 26 wherein the polyphosphonate is ethane-1-hydroxy-1,1,2-triphosphonic acid or a pharmaceutically acceptable salt thereof.

33. The composition of claim 26 wherein the polyphosphonate is propane-1,2,3-triphosphonic acid or a pharmaceutically acceptable salt thereof.

34. The composition of claim 26 wherein the polyphosphonate is butane-1,2,3,4-tetraphosphonic acid or a pharmaceutically acceptable salt thereof.

35. The composition of claim 26 wherein the polyphosphonate is hexane-1,2,3,4,5,6-hexaphosphonic acid or a pharmaceutically acceptable salt thereof.

36. The composition of claim 26 wherein the polyphosphonate is methanephenylaminodiphosphonic acid or a pharmaceutically acceptable salt thereof.

37. A method for treating Paget's disease comprising systemically administering to an animal afflicted therewith an effective but non-toxic amount of a polyphosphonate selected from the group consisting of $$(I)\ R_1 \left[ \begin{array}{c} H \\ | \\ C \\ | \\ PO_3H_2 \end{array} \right]_n R_2 \quad \text{and} \quad (II)\ R_3 - \begin{array}{c} PO_3H_2 \\ | \\ C - R_4 \\ | \\ PO_3H_2 \end{array}$$

wherein $R_1$ and $R_2$ are each hydrogen or $CH_2OH$; $n$ is an integer of from 3 to 10; $R_3$ is hydrogen, alkyl containing from one to about 20 carbon atoms, alkenyl containing from two to about 20 carbon atoms, phenyl, naphthyl, phenylethenyl, benzyl, halogen, amino, substituted amino, $-CH_2COOH$, $-CH_2PO_3H_2$, $-CH(PO_3H_2-CH_2CH(PO_3H_2)_2$; $R_4$ is hydrogen, lower alkyl, amino, benzyl, halogen, hydroxyl, $-CH_2COOH$, $-CH_2PO_3H_2$, or $-CH_2CH_2PO_3H_2$; and the pharmaceutically acceptable salts thereof.

38. The method of claim 37 wherein the polyphosphonate is ethane-1-hydroxy-1,1-diphosphonic acid or a pharmaceutically acceptable salt thereof.

39. The method of claim 37 wherein the polyphosphonate is methanedichlorodiphosphonic acid or a pharmaceutically acceptable salt thereof.

40. A method for treating osteoporosis comprising administering to an animal afflicted therewith an effective but non-toxic amount of polyphosphonate selected from the group consisting of

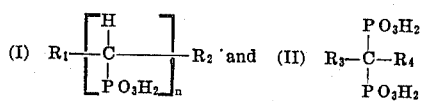

wherein $R_1$ and $R_2$ are each hydrogen or $CH_2OH$; $n$ is an integer of from 3 to 10; $R_3$ is hydrogen, alkyl containing from one to about 20 carbon atoms, alkenyl containing from two to about 20 carbon atoms, phenyl, naphthyl, phenylethenyl, benzyl, halogen, amino, substituted amino, $-CH_2COOH$, $-CH_2PO_3H_2$, $-CH(PO_3H_2-CH_2CH(PO_3H_2)_2$; $R_4$ is hydrogen, lower alkyl, amino, benzyl, halogen, hydroxyl, $-CH_2COOH$, $-CH_2PO_3H_2$, or $-CH_2CH_2PO_3H_2$; and the pharmaceutically acceptable salts thereof.

41. The method of claim 40 wherein the polyphosphonate is ethane-1-hydroxy-1,1-diphosphonic acid or a pharmaceutically acceptable salt thereof.

42. The method of claim 40 wherein the polyphosphonate is methanedichlorodiphosphonic acid or a pharmaceutically acceptable salt thereof.

43. A method for treating arthritis comprising administering to an animal afflicted therewith an effective but non-toxic amount of a polyphosphonate selected from the group consisting of

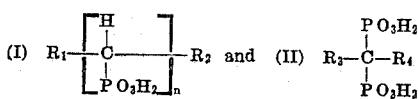

wherein $R_1$ and $R_2$ are each hydrogen or $CH_2OH$; $n$ is an integer of from 3 to 10; $R_3$ is hydrogen, alkyl containing from one to about 20 carbon atoms, alkenyl containing from two to about 20 carbon atoms, phenyl, naphthyl, phenylethenyl, benzyl, halogen, amino, substituted amino, $-CH_2COOH$, $-CH_2PO_3H_2$, $-CH(PO_3H_2-CH_2CH(PO_3H_2)_2$; $R_4$ is hydrogen, lower alkyl, amino, benzyl, halogen, hydroxyl, $-CH_2COOH$, $-CH_2PO_3H_2$, or $-CH_2CH_2PO_3H_2$; and the pharmaceutically acceptable salts thereof.

44. The method of claim 43 wherein the polyphosphonate is ethane-1-hydroxy-1,1-diphosphonic acid or a pharmaceutically acceptable salt thereof.

45. The method of claim 43 wherein the polyphosphonate is methanedichlorodiphosphonic acid or a pharmaceutically acceptable salt hereof.

46. A method for treating urolithiasis comprising administering to an animal afflicted therewith an effective but non-toxic amount of a polyphosphonate selected from the group consisting of

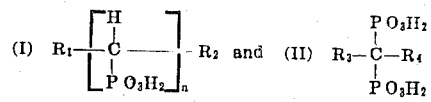

wherein $R_1$ and $R_2$ are each hydrogen or $CH_2OH$; $n$ is an integer of from 3 to 10; $R_3$ is hydrogen, alkyl containing from one to about 20 carbon atoms, alkenyl containing from two to about 20 carbon atoms, phenyl, naphthyl, phenylethenyl, benzyl, halogen, amino, substituted amino, $-CH_2COOH$, $-CH_2PO_3H_2$, $-CH(PO_3H_2-CH_2CH(PO_3H_2)_2$; $R_4$ is hydrogen, lower alkyl, amino, benzyl, halogen, hydroxyl, $-CH_2COOH$, $-CH_2PO_3H_2$, or $-CH_2CH_2PO_3H_2$; and the pharmaceutically acceptable salts thereof.

47. The method of claim 46 wherein the polyphosphonate is ethane-1-hydroxy-1,1-diphosphonic acid or a pharmaceutically acceptable salt thereof.

48. The method of claim 46 wherein the polyphosphonate is methanedichlorodiphosphonic acid or a pharmaceutically acceptable salt thereof.

49. A method for treating arteriosclerosis comprising administering to an animal afflicted therewith an effective but non-toxic amount of a polyphosphonate selected from the group consisting of

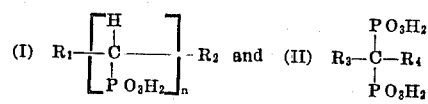

wherein $R_1$ and $R_2$ are each hydrogen or $CH_2OH$; $n$ is an integer of from 3 to 10; $R_3$ is hydrogen, alkyl containing from one to about 20 carbon atoms, alkenyl containing from two to about 20 carbon atoms, phenyl, naphthyl, phenylethenyl, benzyl, halogen, amino, substituted amino, $-CH_2COOH$, $-CH_2PO_3H_2$, $-CH(PO_3H_2-CH_2CH(PO_3H_2)_2$; $R_4$ is hydrogen, lower alkyl, amino, benzyl, halogen, hydroxyl, $-CH_2COOH$, $-CH_2PO_3H_2$, or $-CH_2CH_2PO_3H_2$; and the pharmaceutically acceptable salts thereof.

50. The method of claim 49 wherein the polyphosphonate is ethane-1-hydroxy-1,1-diphosphonic acid or a pharmaceutically acceptable salt thereof.

51. The method of claim 49 wherein the polyphosphonate is methanedichlorodiphosphonic acid or a pharmaceutically acceptable salt thereof.

* * * * *